(12) United States Patent
McInroy

(10) Patent No.: US 6,842,994 B2
(45) Date of Patent: Jan. 18, 2005

(54) PRECISION POSITIONING DEVICE

(75) Inventor: John E. McInroy, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 10/672,954

(22) Filed: Sep. 26, 2003

(65) Prior Publication Data
US 2004/0093753 A1 May 20, 2004

Related U.S. Application Data

(60) Provisional application No. 60/414,751, filed on Sep. 27, 2002.

(51) Int. Cl.[7] .............................. G01B 5/25; B25Q 1/26
(52) U.S. Cl. ........................... 33/613; 33/568; 248/638; 269/71
(58) Field of Search ......................... 33/1 M, 568, 573, 33/613, 645; 248/638, 644, 646, 669, 682; 269/58, 71

(56) References Cited

U.S. PATENT DOCUMENTS

| 3,829,978 A | * | 8/1974 | Basin et al. | 33/568 |
| 4,012,030 A | * | 3/1977 | Hesselgren | 269/71 |
| 4,535,543 A | * | 8/1985 | Linder | 33/613 |
| 4,565,094 A | * | 1/1986 | Sedgewick | 33/568 |
| 4,570,343 A | * | 2/1986 | Bell | 33/645 |
| 4,621,434 A | * | 11/1986 | Hirschmann | 33/1 M |
| 4,796,849 A | * | 1/1989 | Fouassier | 248/638 |
| 5,419,528 A | * | 5/1995 | Carter et al. | 248/638 |
| 5,760,500 A | * | 6/1998 | Kondo et al. | 33/1 M |
| 6,259,265 B1 | * | 7/2001 | Han et al. | 324/761 |
| 2004/0104330 A1 | * | 6/2004 | Kainuma et al. | 248/638 |

* cited by examiner

Primary Examiner—G. Bradley Bennett
(74) Attorney, Agent, or Firm—Emery L. Tracy

(57) ABSTRACT

A precision positioning device is provided. The precision positioning device comprises a precision measuring/vibration isolation mechanism. A first plate is provided with the precision measuring mean secured to the first plate. A second plate is secured to the first plate. A third plate is secured to the second plate with the first plate being positioned between the second plate and the third plate. A fourth plate is secured to the third plate with the second plate being positioned between the third plate and the fourth plate. An adjusting mechanism for adjusting the position of the first plate, the second plate, the third plate, and the fourth plate relative to each other.

27 Claims, 6 Drawing Sheets

PRECISION POSITIONING DEVICE

The present application is a continuation of provisional patent application Ser. No. 60/414,751, filed on Sep. 27, 2002, entitled "Precision Positioning Device".

CONTRACTUAL ORIGIN OF THE INVENTION

This invention was made with U.S. Government support under Contract No. DE-FC02-91ER75680 awarded by the U.S. Department of Energy. The U.S. Government has certain rights in this invention.

BACKGROUND OF THE INVENTION

1. Field of the Invention

This invention relates generally to a precision positioning device and, more particularly, the invention relates to a precision positioning device which provides nesting multi-stages (very coarse, coarse, fine, very fine, etc.), with each stage comprising a parallel kinematic machine (PKM).

2. Description of the Prior Art

A number of precision applications require the ability to move quickly, over a large dynamic range, in several directions, while withstanding failures. Consider a high power telescope mounted on an aircraft. The telescope mount must move quickly to cancel the aircraft vibrations and track out the aircraft motion. For high power telescopes, it may need to maintain angular stability to nano-radian accuracy (billionths of a radian), and be able to continue this accuracy across a dynamic range of a radian. The telescope needs to rotate in at least two directions, and all six axes of motion affect image quality.

SUMMARY

The present invention is a precision positioning device. The precision positioning device comprises a precision measuring/vibration isolation mechanism. A first plate is provided with the precision measuring mechanism or the item to be isolated secured to the first plate. A second plate is secured to the first plate. A third plate is secured to the second plate with the first plate being positioned between the second plate and the third plate. A fourth plate is secured to the third plate with the second plate being positioned between the third plate and the fourth plate. An adjusting mechanism for adjusting the position of the first plate, the second plate, the third plate, and the fourth plate relative to each other.

In addition, the present invention includes an apparatus for precision measuring. The apparatus comprises a first plate group for extra fine positioning. A second plate group is provided for fine positioning with the first plate group nested within the second plate group. A third plate group is provided for course positioning and vibration isolation with the second plate group nested within the third plate group. Adjusting means adjusts the position of the first plate group, the second plate group, and the third plate group.

The present invention includes a method for precision measuring. The method comprises providing a first plate group for extra fine positioning, providing a second plate group for fine positioning, nesting the first plate group within the second plate group, providing a third plate group for course positioning and vibration isolation, nesting the second plate group within the third plate group, and adjusting the position of the first plate group, the second plate group, and the third plate group.

DETAILED DESCRIPTION OF THE PREFERRED EMBODIMENTS

Figure 1:
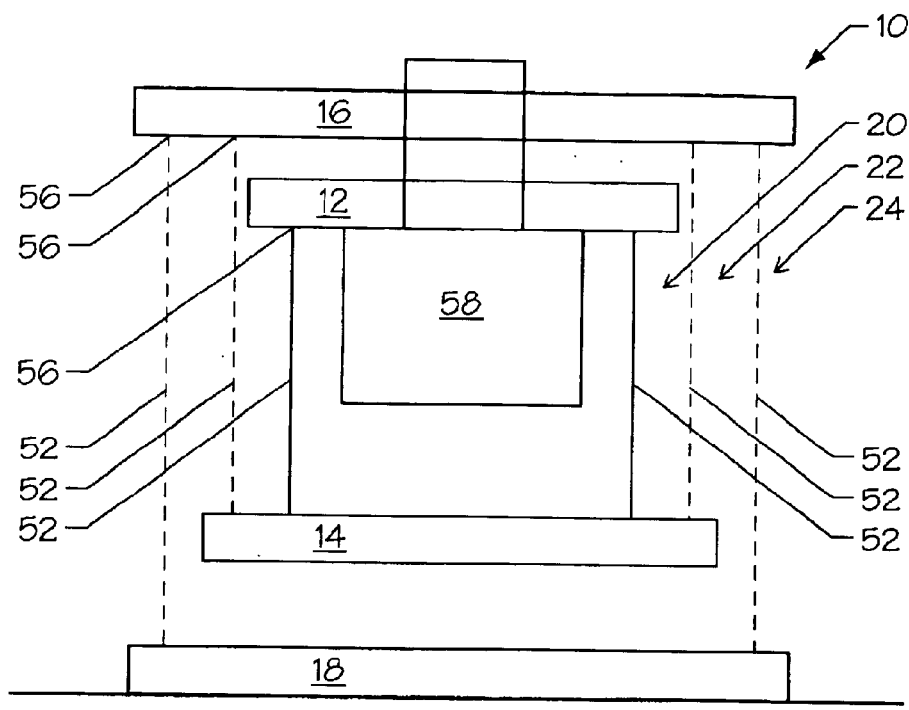
FIG. 1 a is a schematic view illustrating precision positioning device, constructed in accordance with the present invention.

As illustrated in FIGS. 1–14, the present invention is a precision positioning device, indicated generally at 10, which provides nesting multi-stages (very coarse, coarse, fine, very fine, etc.), with each stage comprising a parallel kinematic machine (PKM). The precision positioning device can move in full six degree-of-freedom (DOF) applications with the initial device being designed to move in three DOF (translate in z, rotate in x and y).

The precision positioning device 10 of the present invention includes a first plate 12, a second plate 14, a third plate 16, and a fourth plate 18. The first plate 12 is connected to the second plate 14, the second plate 14 is connected to the third plate 16, and the third plate 16 is connected to the fourth plate 16. Connection of the plates 12, 14, 16, and 18 to each other will be discussed in further detail below.

Furthermore, as illustrated, the first plate 12 and the second plate 14 form a first nesting group 20, the second plate 14 and the third plate 16 form a second nesting group 22, and the third plate 16 and the fourth plate 18 form a third nesting group 24.

Figure 2:
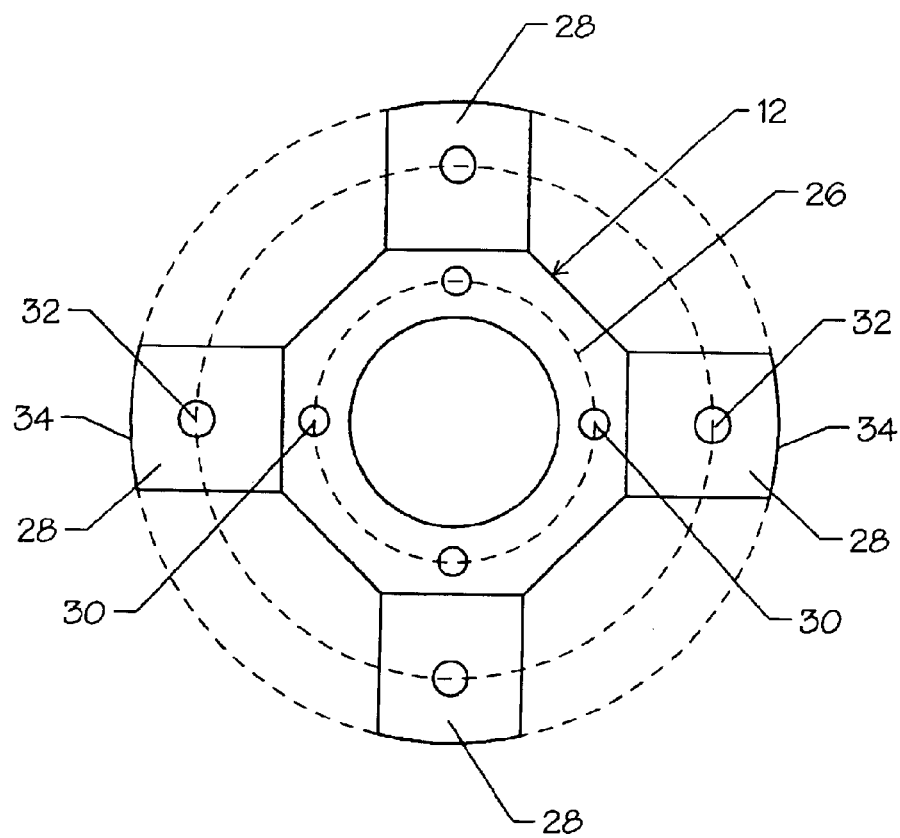
FIG. 2 is a plan view illustrating plate one of the precision positioning device, constructed in accordance with the present invention.

As illustrated in FIG. 2, the first plate includes a center portion 26 having an inner annular aperture with a radius of approximately 2.2 inches and four ears 28 extending from the center portion 26. Through holes 30 are formed in the center portion 26 at a distance of approximately 2.9 inches from a center point of the first plate 12. Beveled through holes 32 are also formed in each ear 28 at a distance of approximately 5.3 inches from the center point of the first plate 12. The diameter of the first plate 12 at the outer edge 34 of the ears is preferably approximately 6.2 inches. The thickness of the first plate 12 is preferably approximately 0.5 inch.

Figure 3:
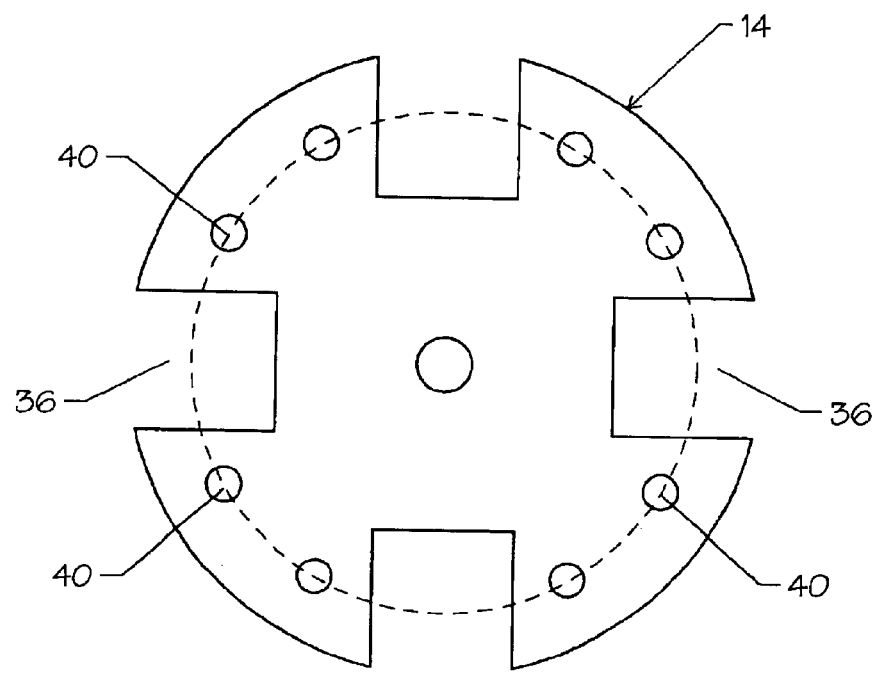
FIG. 3 is a plan view illustrating plate two of the precision positioning device, constructed in accordance with the present invention.

As illustrated in FIG. 3, the second plate 14 includes a plurality of cutouts 36 having a length of approximately 1.2 inches and a width of approximately 1.2 inches. A threaded through hole 38 is formed in the second plate 14 at a center point and a plurality of beveled through holes 40 are formed in the second plate 14 at a distance of approximately 5.3 inches from the center point of the second plate 14. Preferably, there are two beveled through holes 40 between each cutout 36 with a spacing of 30°, although more beveled through holes 40 or less beveled through holes 40 are within the scope of the present invention. Furthermore, the diameter of the second plate 14 is preferably approximately 6.2 inches and the thickness is preferably approximately 0.5 inch.

Figure 4:
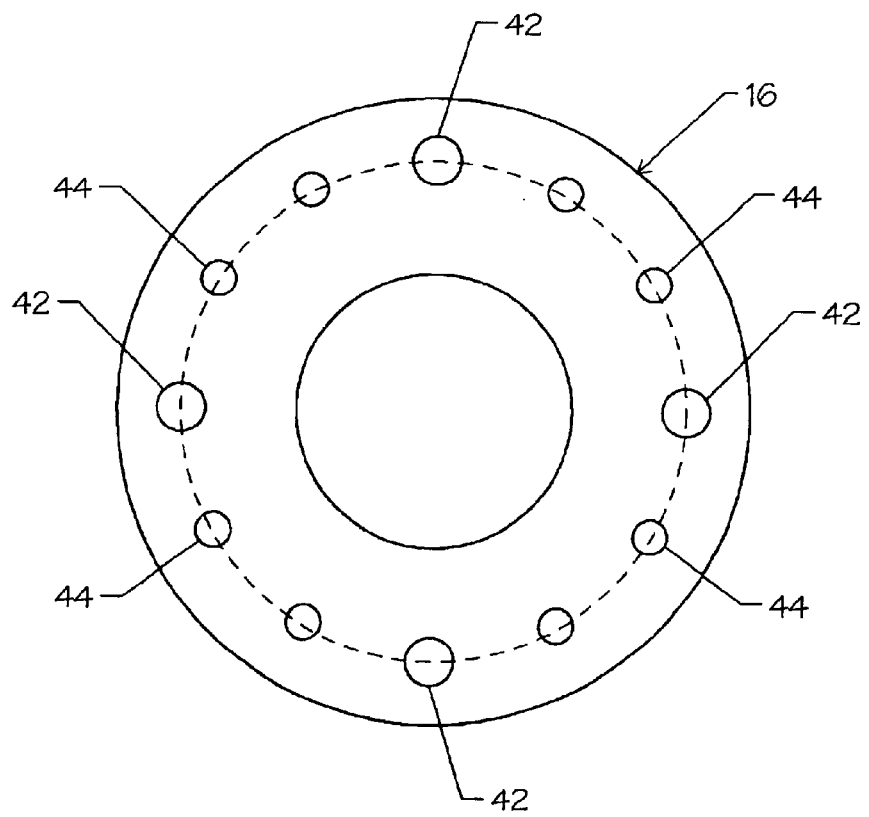
FIG. 4 is a plan view illustrating plate three of the precision positioning device, constructed in accordance with the present invention.

As illustrated in FIG. 4, the third plate 16 has an inner diameter of preferably approximately 3.6 inches and an outer diameter of preferably approximately 6.2 inches. The third plate 16 includes a plurality of threaded through holes 42 formed in the third plate 16 at a distance of approximately 5.3 inches from a center point of the third plate 16. A plurality of beveled through holes 44 are also formed in the third plate 14 at a distance of approximately 5.3 inches from the center point of the third plate 14. Furthermore, the third plate 14 has a thickness of preferably approximately 0.5 inch.

Figure 5:
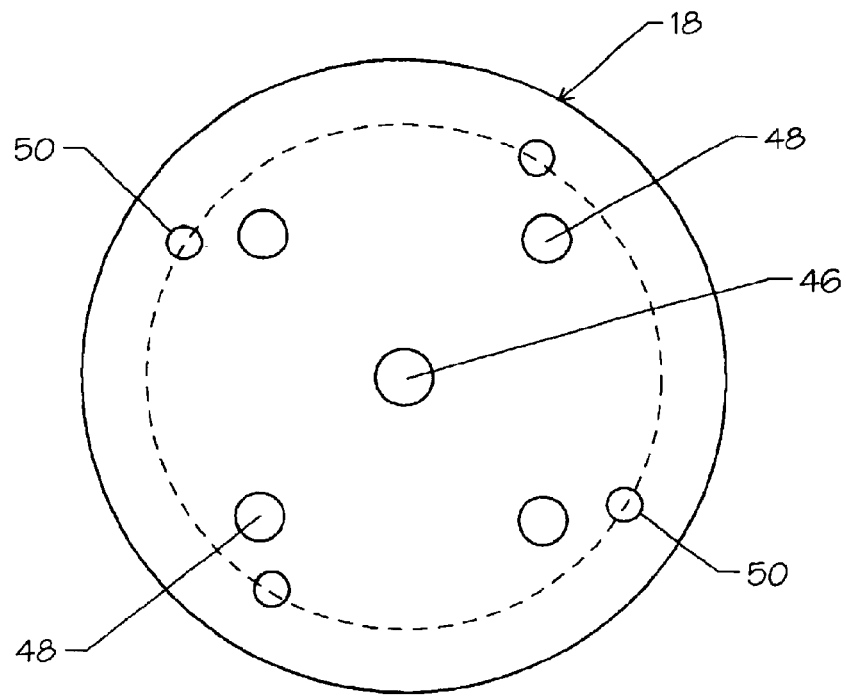
FIG. 5 is a plan view illustrating plate four of the precision positioning device, constructed in accordance with the present invention.
Figure 6:
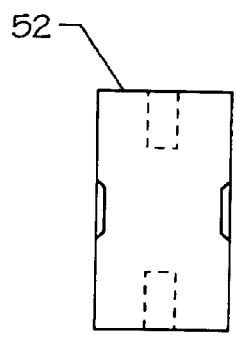
FIG. 6 is a side view illustrating post one of the precision positioning device, constructed in accordance with the present invention.
Figure 7:
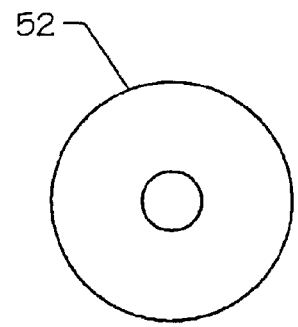
FIG. 7 is a plan view illustrating post one of the precision positioning device, constructed in accordance with the present invention.
Figure 8:
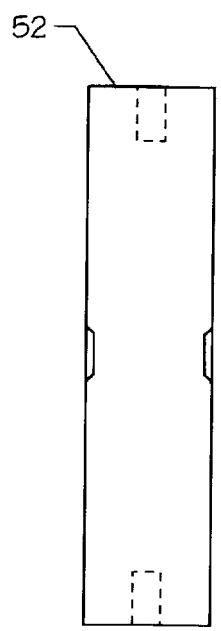
FIG. 8 is a side view illustrating post two of the precision positioning device, constructed in accordance with the present invention.
Figure 9:
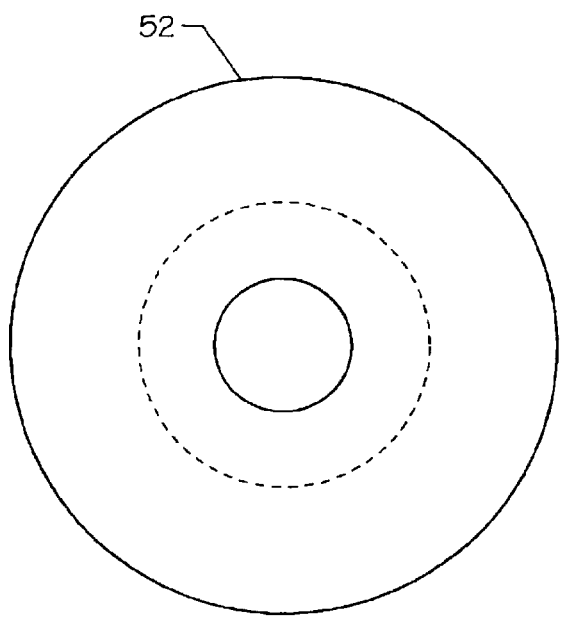
FIG. 9 is a plan view illustrating post two of the precision positioning device, constructed in accordance with the present invention.
Figure 10:
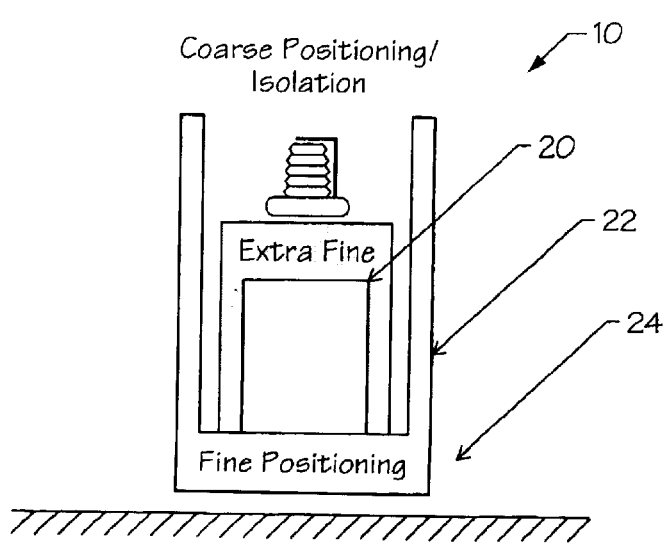
FIG. 10 is a schematic view illustrating the precision positioning device, constructed in accordance with the present invention, with the stages nested to produce a compact device with a low center of gravity resulting in higher performance and ability to fit in tight locations.
Figure 11:
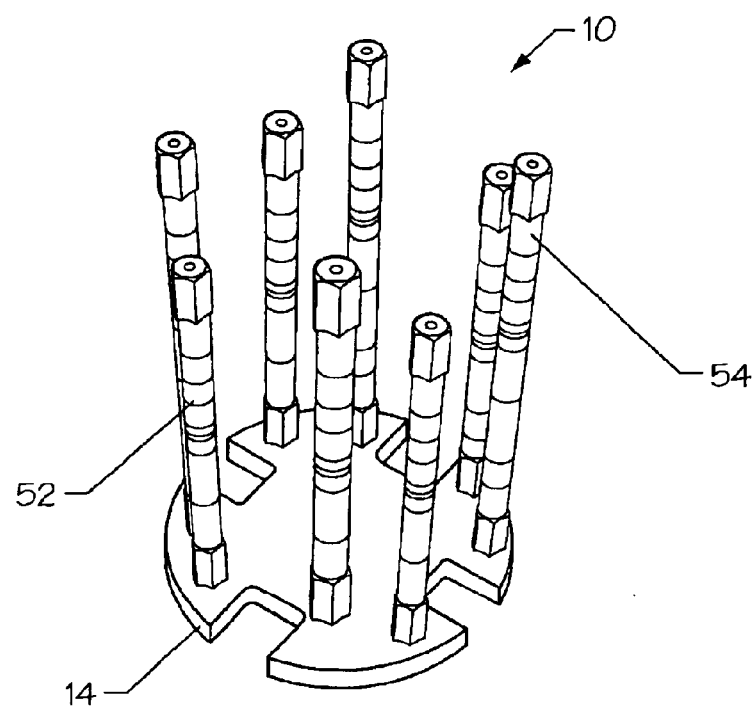
FIG. 11 is a perspective view illustrating an embodiment of the precision positioning device, constructed in accordance with the present invention, with the struts for the two inner stages assembled and four legs used for each stage to add fault tolerance.
Figure 12:
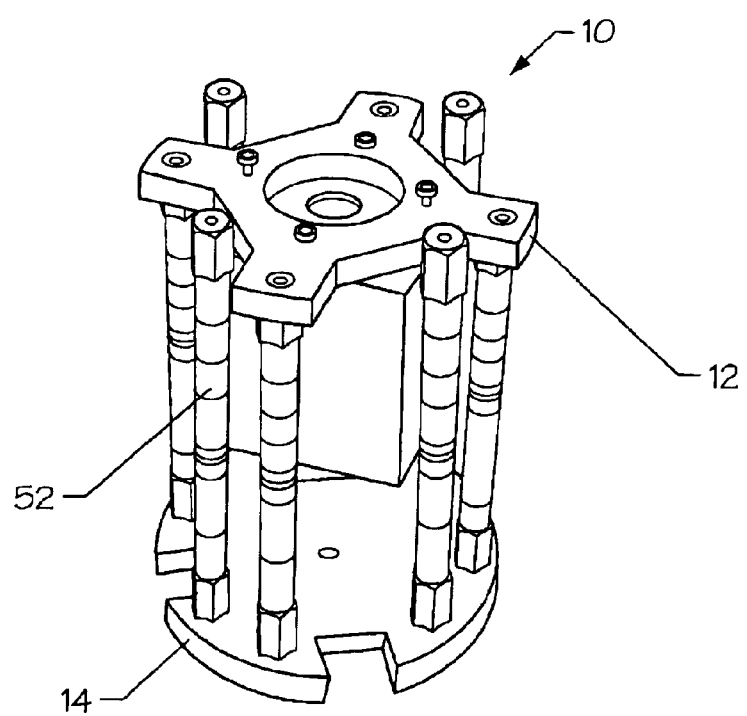
FIG. 12 is a perspective view illustrating the embodiment of the precision positioning device of FIG. 11, constructed in accordance with the present invention, with a high speed camera added as the payload.
Figure 13:
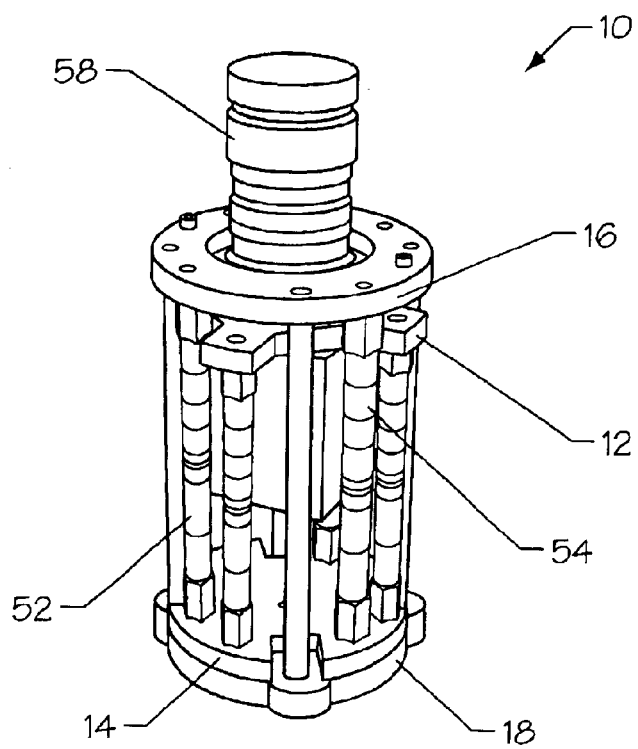
FIG. 13 is a perspective view illustrating the embodiment of the precision positioning device of FIG. 11, constructed in accordance with the present invention, with the device fully assembled with a passive vibration isolation outer stage and two active inner stages.
Figure 14:
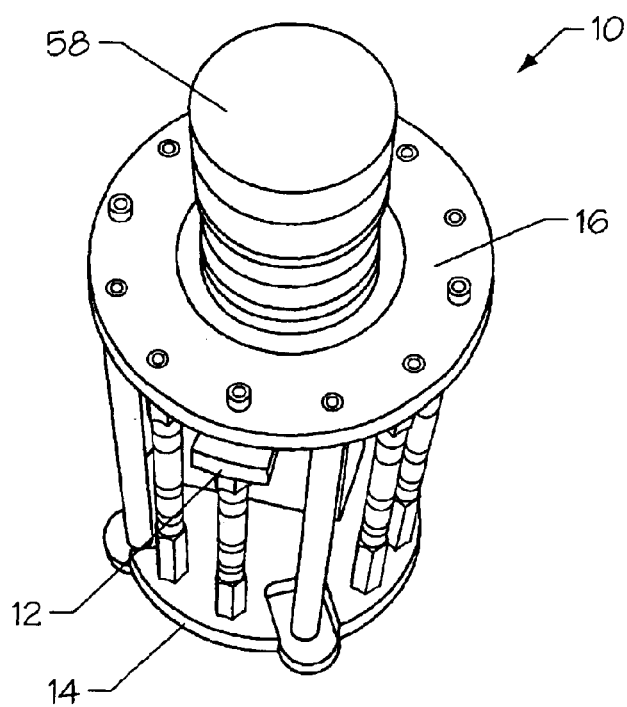
FIG. 14 is a top perspective view illustrating the embodiment of the precision positioning device of FIG. 11, constructed in accordance with the present invention.

As illustrated in FIG. 5, the fourth plate 18 includes a threaded through hole 46 at a center point of the fourth plate 18. In addition, other threaded through holes 48 are formed in the fourth plate 18 with each other threaded through hole 48 being approximately 3.0 inches apart from each other. Beveled through holes 50 are formed in the fourth plate 18 at a distance of approximately 5.3 inches from the center point of the fourth plate 18 with each beveled through hole 50 being approximately 90° from each other. Furthermore, the diameter of the fourth plate 18 is preferably approximately 6.2 inches and the thickness is preferably approximately 0.5 inch.

It should be noted that while certain dimensions and thicknesses are provided for the first plate 12, the second plate 14, the third plate 16, and the fourth plate 18, the person skilled in the art will understand that these dimensions and thicknesses are for illustrative purposes only and other dimensions and thicknesses are within the scope of the present invention. Furthermore, while the positioning of the beveled through holes and threaded through holes on each of the plates 12, 14, 16, and 18, respectively, have been set forth at a certain distance from the center point, it is within the scope of the present invention to form the beveled through holes and threaded through holes at various different distances from the center point of each of the plates 12, 14, 16, and 18 so long as the appropriate beveled through holes and the threaded through holes are aligned for receiving the legs 52. The alignment of the beveled through holes and the threaded through holes for receiving the legs 52 are illustrated in the drawings.

Each three DOF PKM stage consists of three or four legs 52, with each leg 52 having a linear actuator 54 or the like to change each leg's length. In addition, each leg 52 has a rotation joint 56 at each end in addition to the linear actuator 54. For a three leg PKM, the legs 52 would preferably be separated by 120°, thus forming a three-leg table. For a four leg PKM, the legs 52 would be preferably separated by 90°. The three DOF PKM nests together to save space and improve the dynamic response of the precision positioning device 10.

The nested design of the precision positioning device 10 of the present invention allows multi-stage performance in a small package. The addition of a fourth leg 52 per stage allows very high levels of fault tolerance.

Furthermore, the precision positioning device 10 of the present invention can be accommodated within volumes not possible with alternative technology, and have high dynamic performance because of a low center of gravity. This is essential for retrofits, as well as mobile platforms.

As understood by those persons skilled in the art, the drawings illustrate one embodiment of the precision positioning device 10 of the invention designed specifically for precision pointing and vibration isolation of a CCD camera 58 (or other sensitive scientific instrument). Such a unit would be especially useful for air and space based reconnaissance or mapping systems. For this particular application, the legs 52 have a rotary flexure joint 56 at each end and a PZT actuator in the middle (model P-843.60 Pre-loaded PZT translator manufactured by PI Polytec Co.). For the middle (fine) stage, standoff posts (FIG. 6) are used to increase the overall length of the legs. For the outer (coarse) stage, a post (FIG. 8) is connected to a passive, elastomeric absorber. The legs 52 are bolted to the plates 12, 14, 16, and 18, as illustrated (FIGS. 10–14). Based on sensor measurements from the CCD camera 58 and accelerometers 60, the leg 52 lengths are then controlled to minimize the adverse effects of vibrations and have the camera track objects.

Precision positioning and vibration isolation are important in a number of aerospace, military, and manufacturing applications. As miniaturization proceeds in manufacturing, this technology is expected to grow in importance. For instance, the ambient seismic vibrations in a semi-conductor foundry are becoming increasingly problematic. The precision positioning device 10 of the present invention provides a way of mitigating the negative effects of these vibrations. Similar problems occur in a variety of scientific instruments including scanning electron microscopes, scanning tunneling microscopes, atomic force microscopes, and gravity wave detectors. Aerospace applications include high-resolution mapping, vibration isolation for news helicopters (both for cameras and crew) and police helicopter camera isolation. Other applications include isolation of ambulance (ground or air-based) vibrations, especially for patients. For these purely vibration isolation applications that do not require any position measurement, the CCD camera would not be necessary. Instead, for instance, the present invention would form a leg of a stretcher, and the stretcher would be attached where the CCD is shown.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A precision positioning device comprising:
   a first plate, the precision measuring mean secured to the first plate;
   a second plate secured to the first plate;
   a third plate secured to the second plate, the first plate being positioned between the second plate and the third plate;
   a fourth plate secured to the third plate, the second plate being positioned between the third plate and the fourth plate; and
   adjusting means for adjusting the position of the first plate, the second plate, the third plate, and the fourth plate relative to each other.

2. The precision positioning device of claim 1 wherein the first plate is secured to the second plate by a plurality of first legs.

3. The precision positioning device of claim 2 wherein each of the first legs have a length, the length being adjustable.

4. The precision positioning device of claim 2 and further comprising:
   a flexure joint between each end of the first legs and the first and second plates.

5. The precision positioning device of claim 1 wherein the second plate is secured to the third plate by a plurality of second legs.

6. The precision positioning device of claim 5 wherein each of the second legs have a length, the length being adjustable.

7. The precision positioning device of claim 5 and further comprising:
   a flexure joint between each end of the second legs and the second and third plates.

8. The precision positioning device of claim 1 wherein the third plate is secured to the fourth plate by a plurality of third legs.

9. The precision positioning device of claim 8 wherein each of the third legs have a length, the length being adjustable.

10. The precision positioning device of claim 8 and further comprising:
    a flexure joint between each end of the third legs and the third and fourth plate.

11. The precision positioning device of claim 1 and further comprising:
    a precision measuring/vibration isolation mechanism.

12. An apparatus for precision measuring, the apparatus comprising:
    a first plate group for extra fine positioning;
    a second plate group for fine positioning, the first plate group nested within the second plate group;
    a third plate group for course positioning and vibration isolation, the second plate group nested within the third plate group; and
    adjusting means for adjusting the position of the first plate group, the second plate group, and the third plate group.

13. The apparatus of claim 12 wherein the first plate group includes a first plate and a second plate.

14. The apparatus of claim 13 wherein the second plate group includes the second plate and a third plate.

15. The apparatus of claim 14 wherein the third plate group includes the third plate and a fourth plate.

16. The apparatus of claim 12 wherein the plate groups are nested together by a plurality of legs.

17. The apparatus of claim 16 and further comprising:
    adjusting means associated with the legs for adjusting the length of the legs.

18. The apparatus of claim 16 and further comprising:
    a flexure joint between each end of the legs and each of the plate groups.

19. The apparatus of claim 12 and further comprising:
    a precision measuring device secured to the first plate group.

20. A method for precision measuring, the method comprising:
    providing a first plate group for extra fine positioning;
    providing a second plate group for fine positioning;
    nesting the first plate group within the second plate group;
    providing a third plate group for course positioning and vibration isolation;
    nesting the second plate group within the third plate group; and
    adjusting the position of the first plate group, the second plate group, and the third plate group.

21. The method of claim 20 wherein the first plate group includes a first plate and a second plate.

22. The method of claim 21 wherein the second plate group includes the second plate and a third plate.

23. The method of claim 22 wherein the third plate group includes the third plate and a fourth plate.

24. The method of claim 20 and further comprising:
    nesting the plate groups together by a plurality of legs.

25. The method of claim 24 and further comprising:
    adjusting the length of the legs.

26. The method of claim 24 and further comprising:
    rotationally securing each end of the legs and each of the plate groups.

27. The method of claim 20 and further comprising:
    securing a precision measuring device to the first plate group.

* * * * *

UNITED STATES PATENT AND TRADEMARK OFFICE
CERTIFICATE OF CORRECTION

PATENT NO. : 6,842,994 B2
DATED : January 18, 2005
INVENTOR(S) : John E. McInroy It is certified that error appears in the above-identified patent and that said Letters Patent is hereby corrected as shown below:

Column 1,
Line 6, under "CONTRACTUAL ORIGIN OF INVENTION", delete lines 7-10 and insert the following:
-- This invention was made with U.S. Government support under DODARMY 1731, contract #DAAD19-02-1-0102 awarded 05/02/2002, with a period of performance of 06/1/2002 - 05/31/2005. --.

Signed and Sealed this

Eighth Day of November, 2005

JON W. DUDAS
*Director of the United States Patent and Trademark Office*